(12) United States Patent
Liu

(10) Patent No.: US 8,389,110 B2
(45) Date of Patent: Mar. 5, 2013

(54) COMPOSITIONS FOR PREPARING PLANT FIBER COMPOSITES AND PLANT FIBER COMPOSITES PREPARED FROM THE SAME

(76) Inventor: Hsien-Cheng Liu, Kaohsiung County (TW)

( * ) Notice: Subject to any disclaimer, the term of this patent is extended or adjusted under 35 U.S.C. 154(b) by 249 days.

(21) Appl. No.: 13/018,491

(22) Filed: Feb. 1, 2011

(65) Prior Publication Data
US 2012/0196123 A1 Aug. 2, 2012

(51) Int. Cl.
*B32B 21/02* (2006.01)
*B29B 9/06* (2006.01)

(52) U.S. Cl. ............ 428/292.4; 264/141; 523/128; 524/47

(58) Field of Classification Search ............ None
See application file for complete search history.

(56) References Cited

U.S. PATENT DOCUMENTS
2005/0158541 A1 * 7/2005 Tanaka .............. 428/357

FOREIGN PATENT DOCUMENTS
CN 101871190 * 10/2010

* cited by examiner

*Primary Examiner* — Jennifer Chriss
*Assistant Examiner* — Camie Thompson
(74) *Attorney, Agent, or Firm* — Frenkel & Associates, P.C.

(57) ABSTRACT

Provided is a composition for preparing plant fiber composite has, by weight based on the whole composition: a plant fiber raw material in an amount ranging from 60% to 80%; a starch auxiliary in an amount ranging from 10% to 30%; and a biological polymer additive in amount ranging from 10% to 20%, wherein the biological polymer additive includes a plant hormone, an enzyme, a vinegar and an ester of lactic acid. Plant fiber composite prepared from the composition is also provided. The plant fiber composite is derived from recycled material for extrusion and modeling, as a non-toxic and harmless raw material with high utilizing rate of recycled material and substitutes for plastic materials. The plant fiber composite is applied to food container, packing materials for electronic device and agricultural products, seedling trays, or substitutes for timber in the field of building, decoration and furniture.

20 Claims, No Drawings

COMPOSITIONS FOR PREPARING PLANT FIBER COMPOSITES AND PLANT FIBER COMPOSITES PREPARED FROM THE SAME

BACKGROUND OF THE INVENTION

1. Field of the Invention

The invention relates to a plant fiber composite derived from recycled material for extrusion and modeling, which is a non-toxic, harmless raw material using a high ratio of recycled material and used to substitute for plastic materials.

2. Description of the Prior Arts

With progressing of modern society and rapid development of industry, overwhelming use of plastic materials indeed brings vast conveniences to human life, but is also accompanied with heavy pollution to the environment and hampers human health and daily life. Furthermore, cost of plastic materials keeps increasing with rising of oil prices and decreasing nature resources.

On the other hand, high usage of paper in culture industries and business promotes deforestation. Also, carbon dioxide is greatly influenced and green house effect is exacerbated.

To overcome the shortcomings, the present invention provides a composition for preparing a plant fiber composite and plant fiber composite prepared from the composition to mitigate or obviate the aforementioned problems.

SUMMARY OF THE INVENTION

There is an urgent need to find materials to substitute for plastic and paper materials as food containers, wrappers for packing electronic products, agricultural products, containers for culturing plant seedlings, materials for buildings, decorations and furniture.

Therefore, the main objective of the present invention is to provide a composite for substitution of plastics and paper, being recyclable with minimized consumption of water, rarely releasing waste and smoke generating little heat and being time- and electricity-saving during manufacture of the composite.

To achieve the forgoing objective, in one aspect, the present invention provides a composition for a plant fiber composite, which comprises, by weight based on the whole composition:

a plant fiber raw material in an amount ranging from 60% to 80%;

a starch auxiliary in an amount ranging from 10% to 30%; and a biological polymer additive in an amount ranging from 10% to 20%, wherein the biological polymer additive includes plant hormone, enzyme, vinegar and ester of lactic acid.

Preferably, the plant fiber raw material is in an amount of 70%; the starch auxiliary is in an amount of 10%; and the biological polymer additive is in an amount of 20%, by weight based on the whole composition.

In another aspect, the present invention also provides a method for preparing a plant fiber composite, comprising steps of:

mixing the composition as described above to form a mixture, wherein the biological polymer additive includes plant hormone, enzyme, vinegar and ester of lactic acid;

kneading and compressing the mixture at a temperature between 90 and 120° C. in a pressurized and closed environment to obtain a kneaded mixture; and extruding and granulating the kneaded mixture to form mixed granules to obtain the plant fiber composite.

Preferably, the method in accordance with the present invention further comprises cooling the mixed granules to an appropriate temperature and sieving through a sieve with an appropriate pore size to obtained the plant fiber composite after the mixed granules are formed.

In the method of the present invention, the appropriate temperature is preferably between 25° C. and 45°; and more preferably 30° C.

Preferably, cooling the granules to an appropriate temperature includes blowing dry the granules to cool to 30° C.

According to the present invention, the appropriate pore size ranges from 2 mm to 4 mm, for obtaining granules with an average diameter of 3 mm.

According to the present invention, the plant fiber raw material refers to any substance containing plant fiber. Preferably, the plant fiber raw material is selected from the group consisting of: straw, sugarcane residue, maize core, coconut shell, rice husk, wheat bran, sorghum bran, peanut shell, leaves, bamboo leaves, timber dust, bamboo stem dust and combination thereof.

According to the present invention, the starch auxiliary refers to substance containing starch. Preferably, the starch auxiliary is selected from the group consisting of: powder of dried sweet potato, potato, maize and combinations thereof.

Preferably, the biological polymer additive includes plant hormone, enzyme, vinegar and ester of lactic acid.

More preferably, the biological polymer additive is composed of a plant hormone, an enzyme, a vinegar and an ester of lactic acid.

According to the present invention, the plant hormone refers to chemical that regulates plant growth.

According to the present invention, the vinegar refers to acidic liquid obtained form fermentation of biological materials, which includes but not limited to fermentation mixture obtained by crushing, boiling and fermenting rice husks and rice grains.

According to the present invention, kneading and compressing the mixture in a pressurized and closed environment to obtain a kneaded mixture includes stirring the mixture in a sealed chamber to obtain the kneaded mixture.

According to the present invention, extruding and granulating the kneaded mixture to form mixed granules to obtain plant fiber composites includes any applicable technique for plastic granulation known in the art.

According to the present invention, the pore size of the sieve ranges from 2 mm to 4 mm. Preferably, the plant fiber composite has a diameter of about 3 mm.

The present invention also provides a plant fiber composite, which is prepared from the composition and by the method as described above.

According to the present invention, the plant fiber composite has a melting point preferably between 80 and 95° C.; and more preferably 85° C.

According to the present invention, the plant fiber composite has a Shore hardness preferably between 90 and 100 HSD; and more preferably, 96 HSD.

According to the present invention, the plant fiber composite has a tensile strength preferably between 100 kg/cm$^2$ and 200 kg/cm$^2$; and more preferably, about 160 kg/cm$^2$.

According to the present invention, the plant fiber composite has elongation rate preferably between 600% and 900%; and more preferably, about 780%.

According to the present invention, the plant fiber composite has tear strength preferably between 35 kg/cm$^2$ and 50 kg/cm$^2$; and more preferably 45 kg/cm$^2$.

According to the present invention, the plant fiber composite has foaming rate preferably between 2 and 5 times; and more preferably 3 times.

According to the present invention, the plant fiber composite has a flexural strength between 400 kg/cm² and 500 kg/cm²; and more preferably 438 kg/cm².

According to the present invention, the plant fiber composite has a flexural modulus between 32000 kg/cm² and 38000 kg/cm²; and more preferably 35810 kg/cm².

The composition of the present invention has several advantages, because vinegar as used hereby can soften fibers; and plant hormone as used hereby in combination with the vinegar can promote degradation of fibers, allow ester of lactic acid binding to enzyme so as to activate fibers in the composition, and help fusing of trace amounts of lipid membrane with fibers in the same. These results in processed fibers in the plant fiber composite in accordance with the present invention acquire an increased strength. Meanwhile, the composition is processed without additional water through steps of the method in accordance with the present invention; therefore, the composition in processing will not undergo fermentation and degradation by microorganism. Accordingly, products derived from the composition in accordance with the present invention are more durable.

The method in accordance with the present invention has advantages of being energy- and resource-saving and good for environment protection, because the method in accordance with the present invention does not consume water and produces no waste water and smoke during production thereof.

Based on the characteristics, the plant fiber composite in accordance with the present invention belongs to a decomposable green material. The plant fiber composite can be used to produce different products by extrusion in various models. The produced products are proven to have low susceptibility to humidity and high floor loading, be highly waterproof, be stable at varied temperatures during transportation and contain no toxic heavy metals. Therefore, it can substitute for conventional plastic materials and be used as raw materials for food containers, such as fresh food tray and also in other areas of manufacture of wrappers for packing electronic devices and agriculture products, containers for culturing plant seedlings and materials for building, decorations and furniture.

Other objectives, advantages and novel features of the invention will become more apparent from the following detailed description when taken in conjunction with the accompanying drawings.

DETAILED DESCRIPTION OF THE PREFERRED EMBODIMENTS

In the method in accordance with the present invention, agricultural products containing plant fibers are discarded parts and used as a major raw materials in the method of the present invention. The discarded parts are obtained by removal from edible parts of agricultural products and include long fiber component and short fiber component. The long fiber component may be, but is not limited to: straw, sugarcane residue, maize core or coconut shell, which is subjected to washing to clear dust and mud, drying, chopping and pulverizing. The short fiber component may be, but is not limited to: rice husk, bran of wheat or sorghum, peanut shell and leaves of tree or bamboo, or dust of timber or bamboo, which is directly subjected to pulverizing to obtain plant fiber raw material. Subsequently, the plant fiber raw material, starch auxiliary and biological polymer additive are mixed well and kneaded and compressed at a low temperature in a pressurized condition, and then are extruded to form granules, cooled and sieved by a sieve with an appropriate pore size to obtain the plant fiber composite.

The present invention is further illustrated by the following examples; it should be understood that the examples and embodiments described herein are for illustrative purposes only and should not be construed as limiting the embodiments set forth herein.

EXAMPLES

1. Preparation of Granulized Plant Fiber Composite

Discarded parts of several agricultural product were obtained by removing from edible parts of the agricultural product and used as a major raw material and were prepared as following:

70 kg rice husks were dried and pulverized to 40 to 100 mesh, mixed with 10 kg sweet potato powder and 20 kg biological polymer additive containing a plant hormone, an enzyme, a vinegar and an ester of lactic acid at a ratio of 10:5:2:3 by weight, kneaded and compressed at 110° C. and extruded to form granules (CLLDX-150L_Dispersion_Kneader), followed by being blown at 30° C., passed through a sieve with a pore size ranged from 2 mm to 4 mm to obtain granules with an average diameter of 3 mm for convenience of being packed into a vacuum package, wherein granules with diameter less than 2 mm were collected, mixed and recycled to be further compressed and kneaded and granulated to obtain granules of the plant fiber composite to be used as timber-like product.

60 kg rice husks were dried and pulverized to 100 to 200 mesh, mixed with 10 kg sweet potato powder and 30 kg biological polymer additive containing a plant hormone, an enzyme, a vinegar and an ester of lactic acid at a ratio of 10:5:2:3 by weight, kneaded and compressed at 110° C. and extruded to form granules (CLLDX-150L_Dispersion_Kneader), followed by being blown at 30° C., passed through a sieve with a pore size ranged from 2 mm to 4 mm to obtain granules with an average diameter of 3 mm, wherein granules with diameter less than 2 mm were collected, mixed and recycled to be further compressed and kneaded and granulated to obtain granules of the plant fiber composite to be used as plastic-like product.

The plant fiber composite was further used to produce a sheet of plant fiber composite and subjected to injection molding and vacuum molding in accordance with the known techniques in the field of manufacture of plastic product, and their characteristics was further determined as follow.

2. Property Analysis of the Plant Fiber Composite

Granules of plant fiber composite were subjected to analysis of physical properties (ASTM D2240, ASTM D1623, USIFE and ASTM D790) and their results are shown in Table 1.

TABLE 1

The physical properties of the plant fiber composite for injection molding

| Property | Test method | Typical value |
|---|---|---|
| Hardness (HSD) | ASTM D2240 | 96 ± 2 |
| Tensile strength (kg/cm²) | ASTM D1623 | 160 ± 2 |
| Elongation (%) | ASTM D1623 | 780 ± 10 |
| Tear strength (kg/cm²) | ASTM D1623 | 45 ± 1 |
| Foaming rate (time) | USIFE | 3 |

TABLE 1-continued

The physical properties of the plant
fiber composite for injection molding

| Property | Test method | Typical value |
|---|---|---|
| Flexural strength (kg/cm$^2$) | ASTM D790 | 438 ± 5 |
| Flexural modulus (kg/cm$^2$) | ASTM D790 | 35810 ± 60 |

(1) Samples of products obtained from granules of plant fiber composite as described above were sent to Material & Engineering Laboratory in SGS Taiwan Ltd. (Kaohsiung, Taiwan) for immersion test, 10% floor loading test (ASTM695), analysis of component and test for melting point (differential scanning calorimetry).

Immersion Test:

Programmable Temperature & Humidity Chamber (HRM-80, Taichi, Taiwan) was used as experimental device and set up at a condition of an ambient temperature at 23±2° C. and a relative humidity at 50±5% RH. Sample obtained as described above was immersed in 100° C. water bath for 24 hours and observed.

Results showed that surface of the sample slightly rumpled, indicating that the sample has low susceptibility and high resistance to humidity.

10% Floor Loading Test (ASTM695):

Universal Testing Machine (5569, Instron) was used as experimental device and set up at a condition of an ambient temperature at 23±2° C. and a relative humidity at 50±5% RH. The used test method was Standard Test Method for Compressive Properties of Rigid Plastics (ASTM D695-02a). The test condition was at 1.3 mm/min. Result was showed by average of triplicate sample as 59.6 kgf/cm$^2$. While losing 10% after immersion test, floor loading of the sample still kept at 59 kgf/cm$^2$, which is superior to timber.

Melting Point Test:

Samples with thickness of 1 mm or 2 mm were examined by differential scanning calorimetry (DSC) (TAQ10). Scanning temperature ranged from 30° C. to 350° C. at a increasing rate of 10° C./min. Results showed melting point of the sample with thickness of 1 mm was 85.88° C. and that of sample with thickness of 2 mm was 85.62° C.

Component Analysis:

Component analysis of the sample obtained as described above was performed by Fourier transform infrared spectroscopy (FTIR) (Varian 3100). According to FTIR spectrum of the sample, the sample contained at least polylactic acid (PLA). Results of component analysis showed that granules of plant fiber composite, that was derived from plant fibers as the major component through kneading and compressing in a sealed environment, comprised poly (lactic-co-glycolic acid), (PLGA).

(2) Sample of products prepared from sheets of plant fiber composite were sent to Material & Engineering Laboratory in SGS Taiwan Ltd. (Kaohsiung, Taiwan) and subjected to tests for content of heavy metal, water resistance, water absorbance (ASTM D570), softening temperature (CNS 4393). The results were shown as follow.

The results of test for content of heavy metal showed there were no toxic heavy metal, such as arsenic, barium, chromium, selenium, antimony, cadmium, mercury and lead detected.

Test for water resistance was performed by placing 50 mL water in central of the sample sheet for 24 hours to see if the sample sheet leaked. Results of test for water resistance showed no leaking of the sample sheet was observed and water absorbance is detected to be 7.42%.

Results of test for water resistance and water absorbance proved that vacuum-modeling product prepared from sheet of plant fiber composite was not deliquesced. Vacuum-modeling product sequentially derived from granules and sheets of plant fiber was capable of being used as fresh food tray, and substituted for plastic product.

Test for softening temperature of samples with thickness of 1 mm and 2 mm were determined by the Chinese National Standards (CNS) 4393 (1978) in Taiwan. Results of the test showed that the softening temperature of samples with thickness of 1 mm was 62.0° C. and that with thickness of 2 mm was 64.7° C.

Test for softening temperature of samples was performed under a condition of a high temperature and a closed environment and the results thereof proved that the vacuum-modeling product was softened beyond 62° C.; therefore, it could stand high temperature during transportation.

3. Applications of the Plant Fiber Composite

The granules of the plant fiber composite as described above were used as raw material for injection-modeling method with models and manufacturing machine as known in the art to produce products, such as plant pot saucers, seedling trays, handles of skip rope, materials for electronic devices, imitated boards and the like; or extruded to obtain sheets of plant fiber composite for vacuum-modeling method to produce products, such as fresh food tray, wrappers for packing electronic device. Since obtained products as described above has advantages of low susceptibility to humidity, high water resistance, high floor loading and high temperature resistance during transportation. Furthermore, they contain no heavy metal and can be recycled. The method in accordance with the present invention utilizes less water, expels little waste, produces no smoke and achieves time- and electricity-saving to protect global environment and save natural resources.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A composition for preparing a plant fiber composite, comprising, by weight based on the whole composition: a plant fiber raw material in an amount ranging from 60% to 80%; a starch auxiliary in an amount ranging from 10% to 30%; and a biological polymer additive in an amount ranging from 10% to 20%, wherein the biological polymer additive includes a plant hormone, an enzyme, a vinegar and an ester of lactic acid.

2. The composition according to claim 1, wherein the plant fiber raw material is selected from the group consisting of: straw, sugarcane residue, maize core, coconut shell, rice husk, wheat bran, sorghum bran, peanut shell, leaves, bamboo leaves, timber dust, bamboo stem dust and a combination thereof.

3. The composition according to claim 2, wherein the starch auxiliary is selected from the group consisting of: powder of dried sweet potato, potato, maize and combination thereof.

4. The composition according to claim 2, wherein the biological polymer additive is composed of a plant hormone, an enzyme, a vinegar and an ester of lactic acid.

5. The composition according to claim 4, wherein the plant hormone, the enzyme, the vinegar and the ester of lactic acid are at a ratio of 10:5:2:3 by weight.

6. The composition according to claim 1, wherein the starch auxiliary is selected from the group consisting of: powder of dried sweet potato, potato, maize and a combination thereof.

7. The composition according to claim 1, wherein the biological polymer additive is composed of a plant hormone, an enzyme, a vinegar and an ester of lactic acid.

8. The composition according to claim 7, wherein the plant hormone, the enzyme, the vinegar and the ester of lactic acid are at a ratio of 10:5:2:3 by weight.

9. The composition according to claim 1, wherein the plant fiber raw material is in an amount of 70%; the starch auxiliary is in an amount of 10%; and the biological polymer additive is in an amount of 20% by weight based on the whole composition.

10. The composition according to claim 1, wherein the plant fiber raw material is in an amount of 60%; the starch auxiliary is in an amount of 10%; and the biological polymer additive is in an amount of 30% by weight based on the whole composition.

11. A plant fiber composite, which is produced from the composition according to claim 1 and by steps of:

mixing the composition according to claim 1 to form a mixture;

kneading and compressing the mixture at a temperature between 90° C. and 120° C. in a pressurized and closed environment to obtain a kneaded mixture; and extruding and granulating the kneaded mixture to form mixed granules to obtain the plant fiber composite.

12. The plant fiber composite according to claim 11, which has a melting point between 80° C. and 95° C.

13. The plant fiber composite according to claim 11, which has a Shore hardness between 90 and 100 HSD.

14. The plant fiber composite according to claim 11, which has a tensile strength between 100 kg/cm$^2$ and 200 kg/cm$^2$.

15. The plant fiber composite according to claim 11, which has an elongation between 600% and 900%.

16. The plant fiber composite according to claim 11, which has a tear strength between 35 kg/cm$^2$ and 50 kg/cm$^2$.

17. The plant fiber composite according to claim 11, which has a foaming rate between 2 and 5 times.

18. The plant fiber composite according to claim 11, which has a flexural strength between 400 kg/cm$^2$ and 500 kg/cm$^2$.

19. The plant fiber composite according to claim 11, which has a flexural modulus between 32000 kg/cm$^2$ and 38000 kg/cm$^2$.

20. The plant fiber composite according to claim 11, which has a diameter of 3 mm.

* * * * *